(No Model.)

H. E. MOOMAW.
CAR COUPLING.

No. 428,928. Patented May 27, 1890.

Witnesses
Frank C. Gibson
C. D. Davis

Inventor
H. E. Moomaw
By his Attorney
C. M. Alexander

THE NORRIS PETERS CO., PHOTO-LITHO., WASHINGTON, D. C.

UNITED STATES PATENT OFFICE.

HENRY E. MOOMAW, OF CARYSVILLE, FLORIDA, ASSIGNOR OF ONE-HALF TO E. T. HINOTE, OF SAME PLACE.

CAR-COUPLING.

SPECIFICATION forming part of Letters Patent No. 428,928, dated May 27, 1890.

Application filed March 19, 1890. Serial No. 344,523. (No model.)

*To all whom it may concern:*

Be it known that I, HENRY E. MOOMAW, a citizen of the United States, residing at Carysville, in the county of Washington and State of Florida, have invented certain new and useful Improvements in Car-Couplings, of which the following is a specification, reference being had therein to the accompanying drawings, in which—

Figure 1:
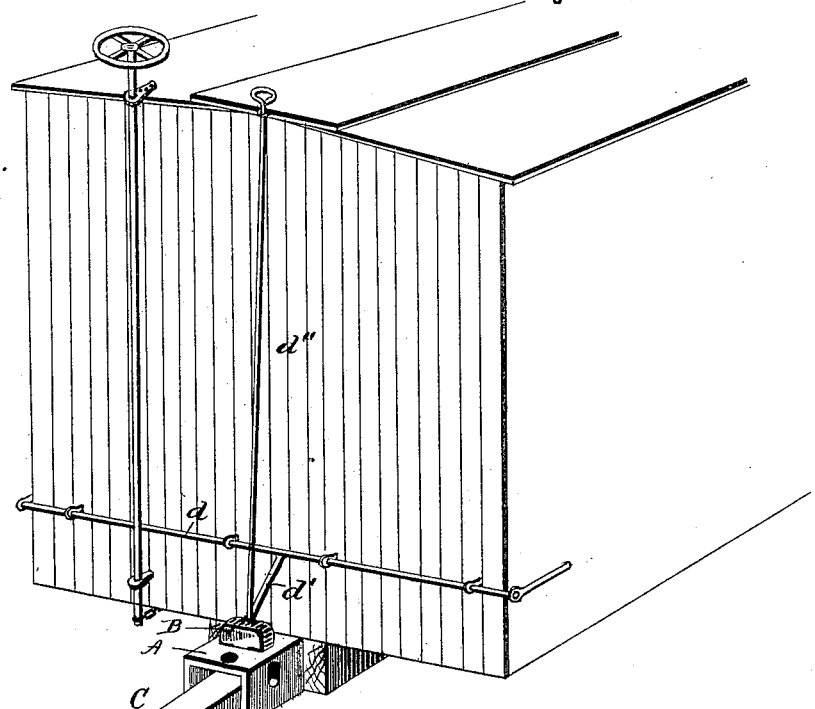
Figure 3:
Figure 2:
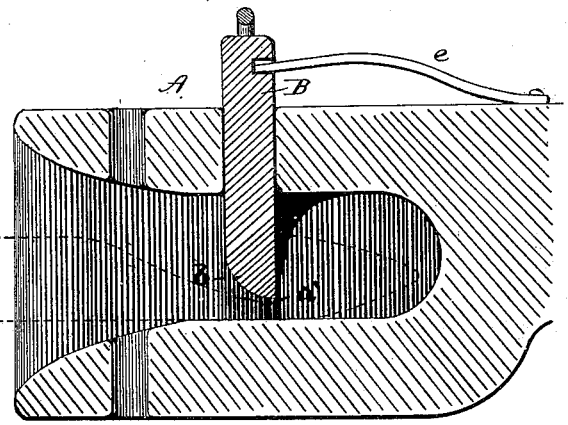
Figure 4:
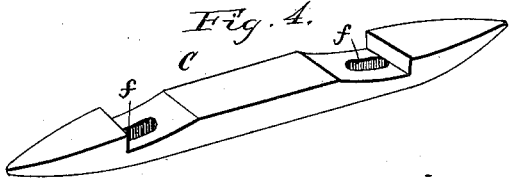

Figure 1 represents a perspective view of the end of a box or freight car provided with my improved automatic coupler; Fig. 2, a longitudinal sectional view of one of the draw-heads; Fig. 3, a transverse sectional view thereof, and Fig. 4 a detail perspective view of the coupling-link I employ.

In the drawings annexed, the letter A designates the draw-head, which may be connected to the draw-bar and to the car-frame in any suitable manner, and which is provided with a broad flaring mouth to assist in directing the coupling-link. Working vertically in a transverse slot formed in the top of the draw-head is a pin or dog B, provided near its upper end with lateral shoulders $a\ a$, which rest upon the top of the draw-head and support and strengthen the dog. The lower end of the dog extends to within a short distance of the bottom of the mouth of the draw-head, and is beveled or rounded off on its front side, as at $b$, in order that the entering link may readily lift it. The interior side walls of the draw-head are grooved vertically at $a'\ a'$, and in these grooves work the side edges of the dog, thereby giving said dog a firm and substantial bearing its entire length and preventing it being bent or broken when subjected to very great strain. To further guide and strengthen the dog and prevent it leaving the draw-head, I secure to its side edges horizontal pins $c\ c$ and cause the same to work in vertical slots in the side walls of the draw-head, as shown.

The coupling-link C consists of a strong bar notched upon its upper side near its ends, the ends being beveled off to a point, in order that they may readily and easily enter the flaring mouths of the draw-heads. The notched portions of the coupling-link are provided with slots $f$, to enable the device to be coupled to the ordinary draw-bar.

To raise the dog in uncoupling, I may use any suitable means; but I prefer to employ the devices shown, which consist of a rock-shaft $d$, journaled upon the end of the car and provided at the sides of the car with operating-handles and an arm $d'$, which latter extends outwardly a short distance and is pivotally connected to the top of the dog. To operate the devices from the top of the car, I attach a rod $d''$ to the end of arm $d'$ and carry it to the top of the car, as shown.

When the cars come together, it will be observed that the beveled or sharpened end of the coupling-link readily passes under and lifts the dog, the latter automatically dropping in the notch in the coupling-link and serving to prevent its withdrawal.

To insure the prompt falling of the dog in case the same is not heavy enough, I may keep it pressed normally downward by means of a spring $e$, secured to the draw-head.

It will be observed that by my invention is produced an extremely simple and practical device that will be automatic in operation and fully meet all requirements as to strength and durability.

In front of the dog a vertical pin-hole may be formed in the draw-head for the purpose of coupling to a draw-head provided with an ordinary link.

It will be observed that the shoulders $a\ a$, formed on the side edges of the dog and resting upon the upper side of the draw-head, not only serve to strengthen the dog, but also support it at the proper height. The horizontal pins $c\ c$ not only assist in guiding the dog in its vertical movements, but also prevent the same from being withdrawn from the draw-head by evil-disposed persons or thrown out by the jolting of the cars while in motion.

Having thus fully described my invention, what I claim is—

The combination of a draw-head provided with vertical grooves $a'$ in its inner walls and an opening in its top, a vertically-working dog B, working in the said opening and grooves, this dog being provided with lateral shoulders $a\ a$, adapted to rest upon the top of the draw-head, and lateral pins $c\ c$, working in vertical slots in the sides of the draw-head, and means for raising said dog, substantially as described.

In testimony whereof I affix my signature in presence of two witnesses.

HENRY E. MOOMAW.

Witnesses:
  ANDREW GRAY,
  W. M. CHRISTMAN.